United States Patent [19]

Herndon et al.

[11] Patent Number: 5,214,359
[45] Date of Patent: May 25, 1993

[54] WINCH WITH ELECTRONIC CURRENT LIMITER

[75] Inventors: Richard S. Herndon, Albany; Richard G. Johnson, Milwaukie, both of Oreg.

[73] Assignee: Warn Industries, Inc., Milwaukie, Oreg.

[21] Appl. No.: 786,739

[22] Filed: Nov. 1, 1991

[51] Int. Cl.⁵ .............................................. H02P 7/00
[52] U.S. Cl. ...................................... 318/434; 361/31
[58] Field of Search ................ 318/434, 432, 280–286; 361/23, 30, 31, 28, 29, 88, 93, 94

[56] References Cited
U.S. PATENT DOCUMENTS

| | | | |
|---|---|---|---|
| 4,260,938 | 4/1981 | Joyer | 318/434 |
| 4,532,571 | 7/1985 | Satou | 361/31 X |
| 4,873,474 | 10/1989 | Johnson | 318/434 |
| 4,905,117 | 2/1990 | Beg | 361/93 |
| 4,956,590 | 9/1990 | Phillips | 318/432 |
| 4,987,358 | 1/1991 | Branam | 318/434 X |

Primary Examiner—Jonathan Wysocki
Attorney, Agent, or Firm—Robert L. Harrington

[57] ABSTRACT

A winch having an electronic current limiter to shut off power to the drive motor when a load limit is attained. The electronic current limiter utilizes a linear hall effect transducer mounted in a torroid surrounding a conductor carrying current to the motor. The transducer outputs a voltage which is compared to a regulated preset voltage. The regulated preset voltage is preset at a value that corresponds to the voltage output of the transducer when the maximum allowed current is flowing in the current carrying conductor. The preset voltage establishes a trip point or threshold. The output voltage of the transducer and the preset voltage are compared and when the output voltage of the transducer crosses the threshold or trip point, power to the winch drive motor is shut off. The electronic current limiter includes a reset circuit that requires the motor to be driven in the reverse direction after an overload shut down before the motor may be run in the initial direction. The electronic current limiter includes a time delay circuit to permit momentary overload conditions such as caused by the required high motor starting currents.

4 Claims, 4 Drawing Sheets

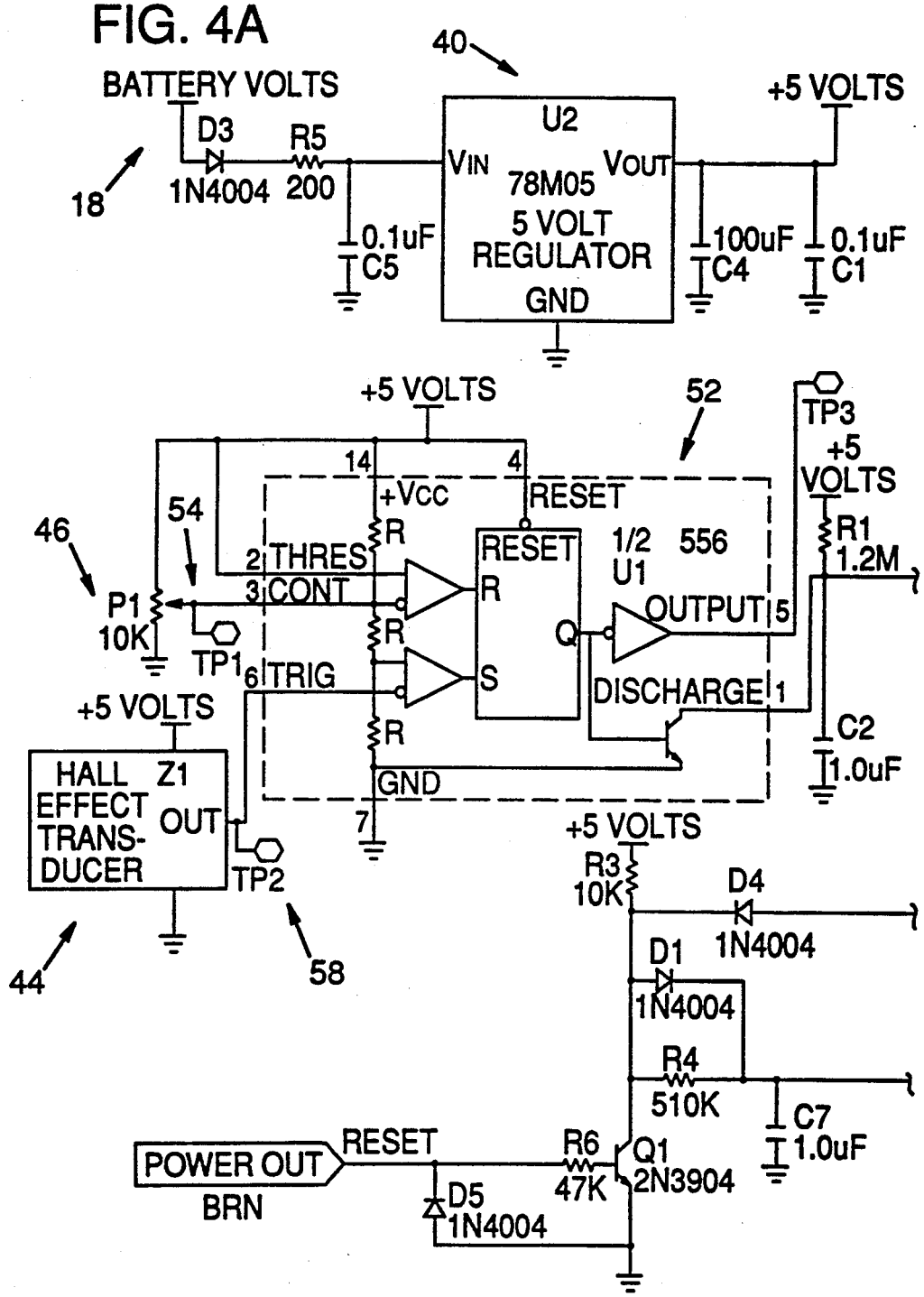

WINCH WITH ELECTRONIC CURRENT LIMITER

BACKGROUND INFORMATION

1. Field of the Invention

This invention relates to vehicle winches and in particular it relates to a load limiting control to automatically shut down the winch motor in the event of an overload condition.

2. Background Information

Vehicle winches are produced in a variety of sizes and configurations. The winches are rated at an individual capacity, generally being listed as a pulling capacity such as 6,000 pounds, 10,000 pounds and so forth. The winch is driven by a motor, most often electric, which receives its power from the vehicle battery. The winch motor has sufficient torque to drive the winch at the rated capacity and the rated capacity is thus at a level at which the winch will continue to perform to reel cable onto the drum with a load attached to the cable. Of necessity, the motor must have the capability to provide more torque than required so that the motor is not stalled before the rated capacity of the winch is attained. It is therefore possible to overload the winch by trying to pull a load over the rated capacity by the continued application of power to the motor. It is recognized that winches without load limiting devices attached to a load beyond the capacity of the winch are readily overloaded by continued application of power to the motor. A severe overload condition would be the condition under which the drive motor stalls.

Many winches are therefore provided with load limiting devices that shut off the power to the drive motor when an overload condition occurs. An example of such a device is the Winch With Shut-Off Load Limiter as disclosed in the commonly assigned U.S. Pat. No. 4,873,474. The device utilizes a hall effect switch to shut off the power to the drive motor when an overload condition occurs. The conductor to the motor is passed through a torroid which concentrates the magnetic flux produced by the current flow. The flux increases with current draw (flow) and is thus related to the power input to the winch.

The hall effect switch receives a controlled voltage input that is independent of the torroid. The output of the hall effect switch trips the motor switch only when the combined voltage and magnetic flux through the torroid reaches a determined level. Thus, the combination offers the means to establish a load limit shut off. However, the motor's pulling capability and the torroid flux output are not predictable from motor to motor. Numerous variables enter into the equation and in the design of the prior load limiter of U.S. Pat. No. 4,873,474, these variables were accommodated by altering the controlled voltage input to the hall effect switch. Conceptually, lowering the voltage input required increased flux to open the switch and raising the voltage required less flux to open the switch. Thus, for each motor, the current draw on the motor was established as that which would produce the pulling force limit. Applying that current through the torroid then established the flux level for tripping the motor switch. With that flux level input to the hall effect switch, the voltage input was varied until the current output at that flux level would open the motor switch. That voltage input was then fixed and conceptually the motor would shut down anytime that the motor current generated the established flux level.

The problem encountered with the above design was that the hall effect switch did not reliably perform at the different voltage input settings. A variable as much as plus or minus 1,000 pounds was experienced and had to be built into the design parameters for the winch. A plus or minus 500 pound variable is encountered without the variable of the hall effect switch and thus in order to make sure that the pulling load of a winch was not exceeded, a 3,000 pound variable had to be accounted for. A motor which was represented to have a 10,000 pound load pulling capability had to be set for automatic shut off at 11,500 pounds which, because of the plus or minus 1,500 pound variable, had to be capable of pulling a 13,000 pound load.

It is an objective of this invention to reduce the variable range for the load limiter and in particular to effectively remove the variable of the hall effect switch.

BRIEF DESCRIPTION OF THE INVENTION

The preferred embodiment of the present invention significantly reduces the variable range of pulling force for the load limiter by removal of the need to vary the voltage input to the hall effect switch. The type of hall effect switch is modified to that of a hall effect transducer. The voltage input to the hall effect transducer is made a constant and is established as the voltage input for which the hall effect transducer was designed to operate. The voltage output of the hall effect transducer is an uninterrupted output and varies only as the result of a variation in the flux generated by current flow through the conductor passing through the torroid.

The adjustment that enables the motor shut off to respond to different flux levels is provided by a comparator. The voltage from the Hall effect transducer is compared in the comparator to a voltage input from a controlled adjustable voltage, e.g., a potentiometer. When the voltage from the hall effect transducer reaches the level established by the controlled source, a signal is generated to turn off the motor. In the same manner as described above, the shut off flux level is determined by establishing current in the conductor passing through the torroid as that needed to pull the maximum load. The controlled voltage source is adjusted to cause the comparator to turn off the motor at that flux level.

With the modifications described, the variable of the hall effect transducer is virtually eliminated and the result is the reduction of the load limit range to 1,000 pounds (plus or minus 500 pounds). A motor represented to have a 10,000 pound pull load capability is set to turn off the motor at 10,500 pounds and the motor is designed to have the capability of pulling 11,000 pounds.

The invention and its benefits will be more fully appreciated upon reference to the following detailed description and the drawings referred to therein.

BRIEF DESCRIPTION OF THE DRAWINGS

FIGS. 4A and 4B include further specifics of the circuit diagram of the electronic current limiter incorporated in the winch of FIG. 1.

DESCRIPTION OF THE PREFERRED EMBODIMENT

Figure 1:
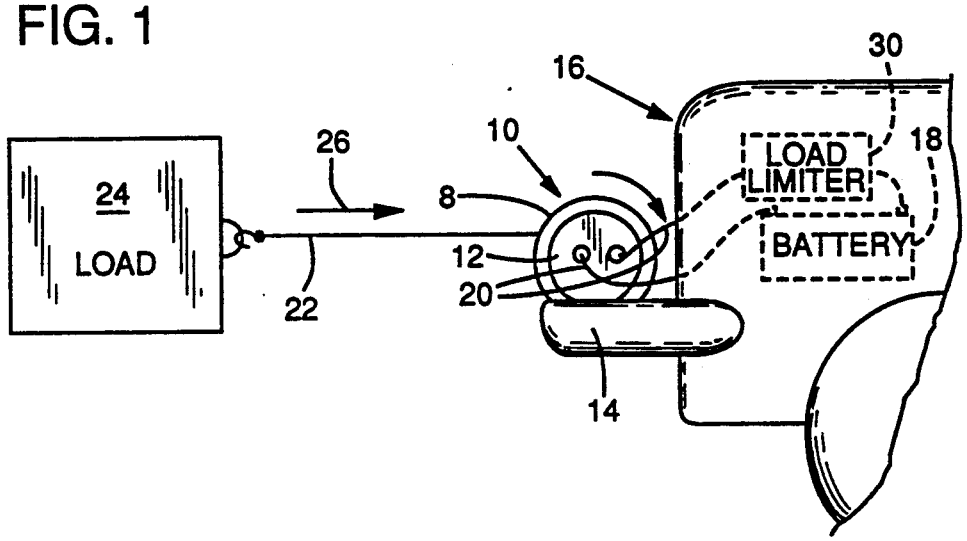
FIG. 1 is a schematic illustration of a vehicle mounted winch pulling a load in accordance with the present invention.

Refer now to FIG. 1 of the drawings which illustrates a winch 10 including a drive motor 12 mounted to the bumper 14 of a vehicle 16. The motor 12 is connected to the vehicle battery 18 through conducting lines 20. The motor is controlled in part by solenoid pack 34 to drive the motor in each rotative direction. The directional rotation of the motor is generally referred to as power-in and power-out. Power-in refers to winding a cable 22 onto a reel 8 of the winch 10 and thereby pull a load 24 (as indicated by arrow 26). Power-out refers to playing cable 22 off the reel 8 (opposite arrow 26).

Figure 2:
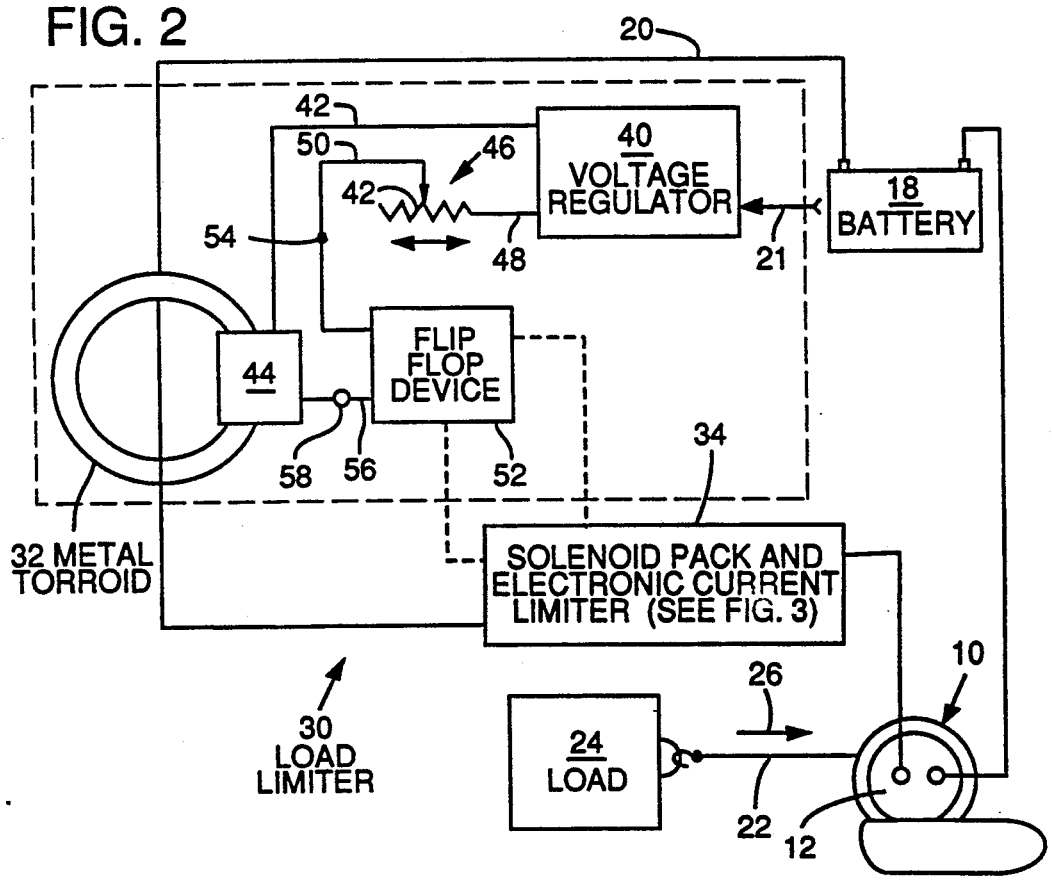
FIG. 2 is a simplified circuit diagram of the electronic current limiter incorporated in the winch of FIG. 1 with emphasis on the components making up the electronic load limiter.

Refer now also to FIG. 2 of the drawings which illustrates in simplified form the circuitry of the present invention to provide an automatic electronic current limiter for the winch 10. Dash lines outline the components contained in electronic load limiter 30. As shown, a vehicle battery 18 is the power source for supplying power via conductor 20 to the motor 12. The conductor 20 is connected to the electronic load limiter 30 which includes a metal torroid 32 (the form of the conductor 20 passing through the torroid 32 is preferably in the form of a bus bar). The conductor 20 connects to a solenoid pack and electronic current limit assembly 34 (associated with motor 12 and described in more detail with reference to FIG. 3). The assembly 34 is coupled to the motor 12 as schematically indicated by line 36. However, it will be understood, particularly with reference to FIG. 3, that reference 36 indicates a coupling of components and not simply a conductor line connection. This will become apparent from the description of FIG. 3 which follows. The battery 18 also supplies power to a voltage regulator 40 of the electronic load limiter 30 through conductor 21. The voltage regulator 40 provides a regulated voltage to linear hall effect transducer 44 via line 42 and to potentiometer 4 via line 48. Line 50 connects the potentiometer 46 to a voltage comparator and flip flop device 52 and the transducer 44 is connected to the voltage comparator and flip flop device 52 by line 56.

The electronic current limiter in this embodiment is a current limiting device that controls the motor 12 when operated in the power-in mode, that is when the cable 22 is being reeled onto the reel (drum) 8. The voltage comparator function of device 52 compares the voltages output from the linear hall effect transducer 44 and the potentiometer 46 to determine whether or not a maximum allowed current level in conductor 20 has been exceeded. The maximum allowed current corresponds to the rated load limit of the winch 10. The conductor 20 passes through the metal torroid 32, and as current flows in the conductor 20 a magnetic flux is produced which is concentrated by the torroid. The linear hall effect transducer 44 is placed in an air gap of the torroid 32. The linear hall effect transducer 44 outputs a voltage as a measure of the flux density produced by the current flowing in the conductor 20. The output voltage of the linear hall effect transducer 44 will thus vary as a result of the current in conductor 20 varying, and its output voltage is input to a comparator device 52 via line 56.

The voltage output of the linear hall effect transducer 44 may be calculated for the maximum allowed current flow in conductor 20, but as a practical matter the output is measured at test point 58 during board test when the maximum allowed current is flowing in conductor 20. This procedure will eliminate variances due to manufacturing tolerances of the components. The potentiometer 46 is adjusted in a conventional manner to provide a comparable voltage value at test point 54. The set voltage output by the potentiometer 46 thus establishes a threshold or trip point.

In the power-in mode, the control voltage of the potentiometer 46 (which is a constant voltage that has been preset), and the output voltage of the linear hall effect transducer 44 are input to the comparator and flip flop device 52. When the current flow in the conductor 20 exceeds the predetermined maximum value, the output of the linear hall effect transducer 44 will drop below that of the preset control voltage of the potentiometer 46 and the switches of the solenoid pack 34 supplying power to the motor will be opened.

Figure 4B:
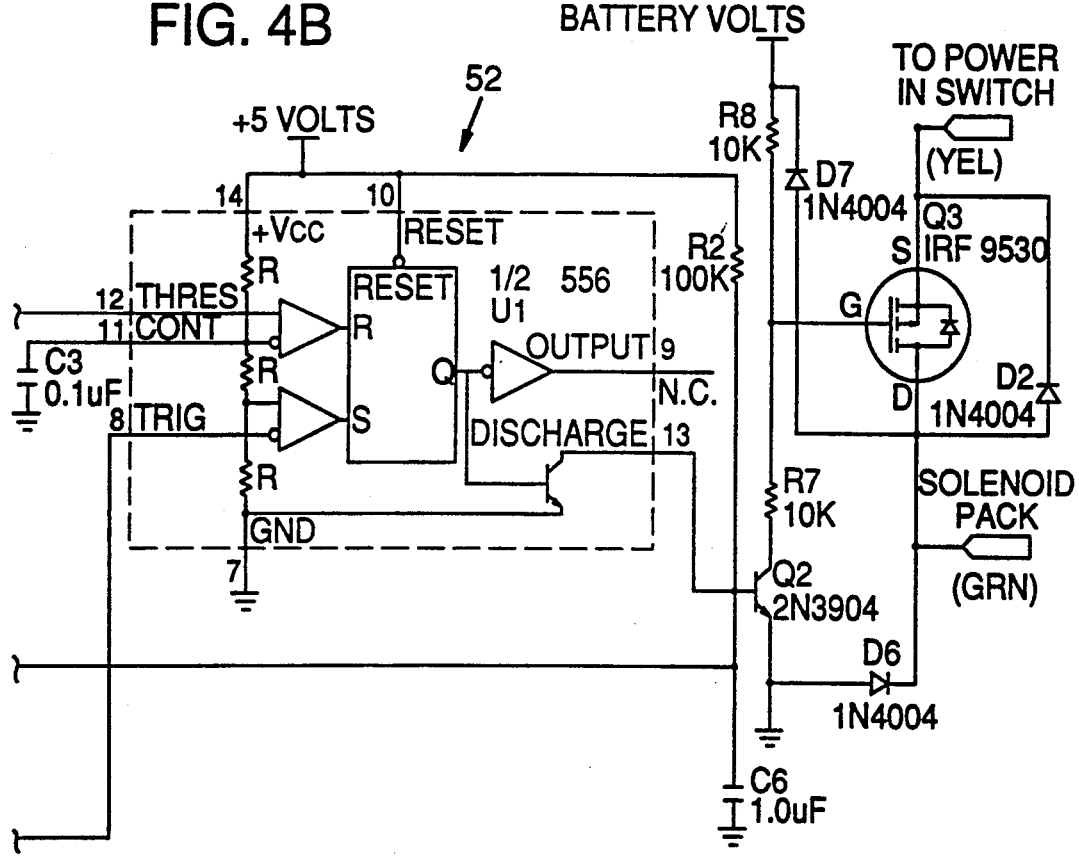

The above is basic to the operation of the circuit controlling the motor 12 in the power-in mode. The circuit from the power supply to the motor via the solenoid pack 34 is complete as long as the current in the conductor 20 does not exceed a predetermined level. When the current level in the conductor 20 exceeds the predetermined level the circuit is opened to shut off power to the motor in the power-in mode. Not detailed in the above description, but included and shown in the detailed circuit of the electronic current limiter of FIGS. 4A and 4B are the time delay circuit and the resetting circuit incorporated in the preferred embodiment. The time delay circuit delays the opening of the power-in circuit to permit short term overload conditions such as those caused by the high motor starting currents. The resetting circuit requires that the motor be driven in the power-out mode (i.e., in the opposite direction of power-in mode) for a period of time, after an overload condition has occurred in the power-in mode to reset the power-in circuit.

Figure 3:
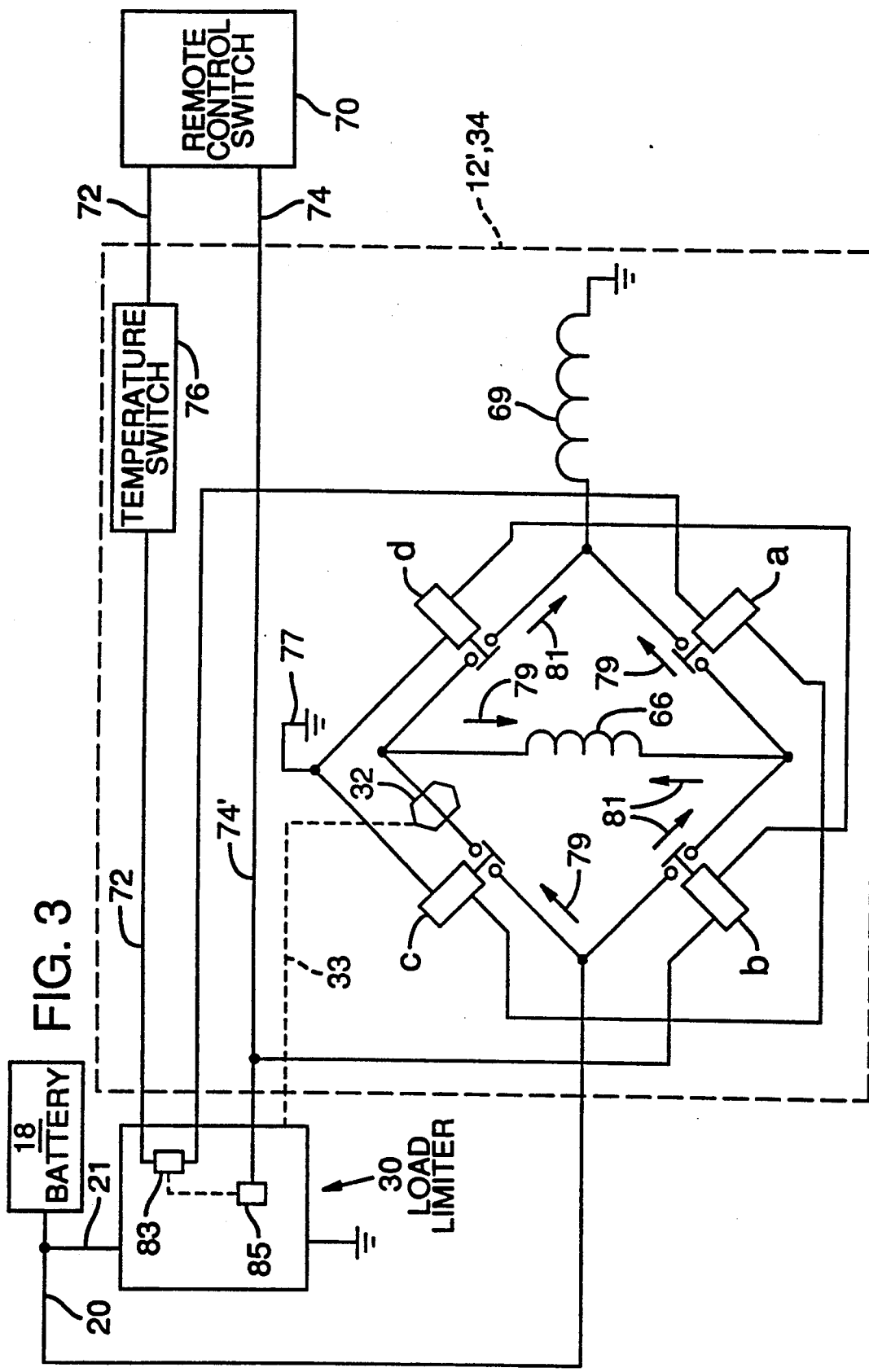
FIG. 3 is a simplified circuit diagram with emphasis on the components making up the solenoid pack and load limiter assembly.

FIG. 3 is intended to illustrate in more detail the function of the solenoid pack indicated at reference 34 of FIG. 2. The components in FIG. 3 have been generally arranged to coincide with the illustration of FIG. 2 but the primary purpose is to describe the electronic circuitry of the assembly 34. The circuitry of assembly 34 and motor 12 are generally contained within the dash line box.

As described in connection with FIG. 2, battery 18 supplies power to the electronic load limiter 30 through conductor 21 and supplies power to the solenoid pack 34, and thus to the motor 12, through conductor 20. Control over the functions is provided by a remote control switch 70 (also powered by battery 18 but the connection is not shown).

Switch 70 initiates the functions of power-in, by energizing conductor 72, and power-out by energizing conductor 74. Referring first to the power-in function, it will be appreciated that a temperature switch 76 is typically included in the power-in circuitry for sensing overheating of the motor and providing automatic shutdown. This function is common to motors and will not be further explained. Conductor 72 provides energy through electronic load limiter 30 (via switch 83) to the solenoid switches a and c and is then connected to ground 77.

Thus, with line 72 energized (and assuming that the load level is not exceeded), solenoid switches a and c are closed and power through conductor 20 is conducted through the solenoid pack assembly as indicated by arrows 79. The field 66 determines the power-in direction and as will be understood, energization of armature 69 (both field 66 and armature 69 being contained in motor 12) generates rotative driving of the drum 8 in direction 26 as illustrated in FIG. 1.

Energizing line 74 through the remote control switch 70 produces closure of solenoid switches b and d and power is then conveyed through the solenoid assembly as indicated by arrows 81. Because of the reverse direction of the power through field 66, the rotative driving of drum 8 is reversed to achieve power-out.

The torroid 32 of electronic load limiter 30 as shown in FIG. 3 is located in the solenoid pack assembly in that it is intended to control the power-in function only. As noted by the dash line 33, the actual location of torroid 32 is within the electronic load limiter and its function has been described. In brief, if the load limit is exceeded, the comparator 52 (FIG. 2) opens a switch (dash line 83) which opens the current between conductor 72 and solenoid a.

Once switch 83 is opened, it can only be closed by switching the remote control switch 70 to power-out. A timing function 85 in the path of the conductor 74' causes a brief time delay and then activates a reset function within the electronic load limiter 30 to close switch 83 and again provide the ability for activation of the power-in function through energization of solenoids a and c from line 72 at remote control 70.

FIGS. 1, 2 and 3 are schematic illustrations but will be understood by those skilled in the art sufficiently to enable the invention to be practiced. The individual components and circuitry will be apparent to those skilled in the art upon awareness of the functions that are to be performed. As a further aid to simplify this task, FIGS. 4a and 4b are provided along with a brief explanation thereof which follows.

POWER SUPPLY: In this embodiment, the power source is a vehicle battery. The supply voltage is regulated to 5 volts by a voltage regulator (U2).

MAGNETIC CIRCUIT: The conductor (bus bar) conducting the motor current in the power-in mode is passed through the center of a metal torroid (see FIG. 2). The torroid has an air gap on one side and a linear hall effect transducer (Z1) placed in the air gap measures the flux concentrated by the torroid in terms of an output voltage.

INPUT COMPARATOR AND FLIP FLOP: The output of the hall effect transducer (Z1) is applied to the TRIGGER (TRIG) input of the first half of the 556 device (U1). The TRIG input is fed to the negative input of an internal comparator. The positive input of this comparator is tied to a point whose voltage is set by the potentiometer (P1).

The output of the comparator is connected to the Set or "S" input of a Set/Reset flip-flop. In this embodiment the Reset "R" input is always true, i.e., whenever the "S" input is not true, the "R" input will be true and the output of the flip-flop (the output of the device) will be low and the DISCHARGE (DIS) output of the device will be an open collector in the off state (no current flow through the transistor). The "S" input on this device has priority, that is if both the "R" and the "S" inputs are true, the output will be SET or will be high. The flip-flop Reset is tied high an is always false.

During board test, the trip point adjustment (P1) will be adjusted such that the flip flop is Set (the "S" input is true) when the current limit is exceeded. If the current is below the trip point the voltage at the output of the transducer (Z1) will be greater than the set point and the "S" input will be false (the flip-flop will be held in reset, the DIS output will be very near ground). If the current limit is exceeded, the output voltage from the transducer (Z1) will go below the trip point level and the "S" input to the flip flop will be true.

TIMING CIRCUIT: (Over current) When the current limit is exceeded and the flip-flop (input half of U1) is Set, the open collector output (DIS) will be off. With the DIS output in the off state, capacitor (C2) will charge through the resistor (R1) and upon achieving a voltage of approximately 3.33 volts, the Reset "R" input of the second half of U1 will become true. The time delay provided by this RC network allows momentary over current conditions, such as motor starting currents, to occur without causing a false over current drop out.

OUTPUT COMPARATOR AND FLIP FLOP (Second half of U1) Under normal operation (no over current condition sensed), the output of the flip-flop will be SET and the DISCHARGE open collector output will be off, the base voltage of the level shifting transistor (Q2) will be very near 5 volts. Q2 will be in an ON state, the voltage on the collector of Q2 will be very near ground producing a Vgs on Q3 (Power MOSFET) of nearly $-12$ volts. This will provide a near short circuit path from the Solenoid Pack lead (GREEN) to the Switched Power in lead (YELLOW).

When the voltage at the THRES of the output side of U1 becomes greater than 3.3 volts (over current condition), the output flip-flop is forced into a reset condition, DIS will be very near ground, the Gate to Source voltage (Q3) will be 0 and the MOSFET output will be in an off state. This opens the current path from the Solenoid Pack lead (GREEN) to the Switched Power in lead (YELLOW lead).

RESET INPUT (BROWN lead) When an over current condition has been sensed and the power-out solenoids are energized, the RESET input will be driven to battery volts. Q1 will be driven to saturation the collector of Q1 will be very near ground). This condition does two things: 1. Capacitor C7 is discharged through resistor R4 at a relatively slow rate, D1 is reverse biased. When the voltage across C7 reaches approximately 1.67 volts, the S (Set) input to the second half of U1 is made true. The power-out solenoids must be energized for a minimum time period in order to set the output and turn on the MOSFET (gate to source voltage is pulled down to 12 volts when the second flip-flop is set). This feature provides a minimum time that the operator must hold Power-out in order to reset the electronic current limiter after a current overload has occurred in the Power-in mode.

2. When RESET (BROWN lead) is at battery voltage (Q1 on), D4 is forward biased, which discharges C6 and turns off the POWER MOSFET. When the Power-out input is again low (not powering out), D4 will be reverse biased and C6 will slowly charge through R2 until the gate to source voltage is sufficient to turn on the MOSFET. This feature is used to delay the closing of the Power-in solenoids immediately after the Power-out solenoids have bee de-energized. This is to insure that the contacts of the Power-out solenoids have completely opened before closing the contacts for Power-in (Break before make condition).

OUTPUT: Q3 is a solid state power MOSFET (Metal Oxide Substrate Field Effect Transistor) which is specifically designed for switching relatively large currents on and off. The Switch is essentially ON (resistance of less than 0.5 ohms typically when the Gate to Source voltage is less than −6 volts. The MOSFET is OFF when the Gate to Source voltage is greater than −0.5 volts. In the area between −0.5 volts and −6 volts the MOSFET is in a linear region.

Diode D2, D6 and D7 provides additional protection for the MOSFET which is susceptible to damage if the source to Drain (D2), Gate to Source (D6), or the Gate to Drain (D7) voltage is greater than 20 volts.

The components of the load limiter are selected to operate within a wide temperature range on the other of +125° C. to −40° C.

While the preferred embodiment details the electronic current limiter applied to a winch of a vehicle, it is apparent that the electronic current limiter may be applied to other devices such as hoists and the like.

Those skilled in the art will recognize that variations and modifications may be made to the embodiments described and illustrated without departing from the true spirit and scope of the invention. The invention is therefore not to be limited to described and illustrated embodiments but is to be determined by the appended claims.

What is claimed is:

1. A winch comprising;
    a winching mechanism including a rotatable drum, a motor coupled to the drum for rotating the drum in either rotative direction, and a power source, the drum configured for winding a cable onto the drum in one rotative direction and defining a power-in mode, and playing cable off the drum in the opposite rotative direction and defining a power-out mode, and the improvement comprising;
    a first conducting line from the power source to the motor for supplying power to the motor to drive the motor in the power-in mode,
    a torroid surrounding the first conducting line for concentrating flux produced as a result of current flowing in the first conducting line,
    a hall effect transducer magnetically coupled to the torroid, a second conducting line from the power source to the transducer, and the combination outputting a voltage as a measure of the current flowing n the first conducting line,
    an adjustable potentiometer and a third conducting line from the power source to the potentiometer for producing a controlled adjustable voltage whereby a threshold voltage is established by adjusting the potentiometer to output a set voltage, the set voltage corresponding to the output voltage of the transducer when a maximum allowed current flows in the first conductor,
    a comparator, said output from the transducer and said output from the potentiometer separately and independently connected to the comparitor for comparing the output voltages of the transducer and the potentiometer, and
    a first switch operable by the comparator to interrupt power through the first conducting line when the output voltage of the transducer crosses the established threshold voltage.

2. A winch as defined in claim 1 wherein the winch motor is provided with a power-in function and a power-out function, a manual control switch to selectively energize one of the first and second functions whereby power from the first conducting line is directed to wind cable onto the drum or unwind cable from the drum, said first switch when activated overriding said power-in function of the manual control switch to shut off the winch motor.

3. A winch as defined in claim 2 including a reset function to reset the first switch and return control to the control switch for energizing the power-in function, said reset function responsive to actuation of the power-out function only.

4. A winch as defined in claim 3 including a time delay function associated with said reset function to require a minimum time of actuation of the power-out function before re-engagement of the power-in function.

* * * * *